Patented July 8, 1924.

1,500,994

UNITED STATES PATENT OFFICE.

RICHARD OWEN JONES, OF CRICKLEWOOD, LONDON, ENGLAND, ASSIGNOR TO COURT-AULDS LIMITED, OF LONDON, ENGLAND, A COMPANY OF GREAT BRITAIN.

EFFECTING THE SEPARATION OF SODIUM CARBONATE FROM LIQUORS OR SOLUTIONS CONTAINING CAUSTIC SODA.

No Drawing. Application filed June 9, 1922. Serial No. 567,202.

*To all whom it may concern:*

Be it known that I, RICHARD OWEN JONES, a subject of the King of Great Britain, residing at 21 Hoveden Road, Cricklewood, London, England, have invented new and useful Improvements in Effecting the Separation of Sodium Carbonate from Liquors or Solutions Containing Caustic Soda, of which the following is a specification.

This invention has for its object to effect the separation, in a convenient and efficient manner, of sodium carbonate from liquors, or solutions, containing caustic soda; such, for example, as are obtained by the treatment of sodium carbonate by means of lime, the said invention consisting in the treatment of the said liquors, or solutions, with an excess of calcium carbonate, whereby the insoluble double compound of sodium carbonate and calcium carbonate is formed and the sodium carbonate content of the said liquors, or solutions, is correspondingly reduced. This operation is expedited by the presence of a small amount of the aforesaid double carbonate.

This invention can, for instance, be advantageously applied to reducing the amount of sodium carbonate in liquors, or solutions, of caustic soda obtained by carrying out the causticizing in two stages according to the process of our application for Letters Patent of even date herewith, viz, first treating the sodium carbonate solution with lime and filtering off the liquor from the calcium carbonate and afterwards treating the said liquor with an additional quantity of sodium carbonate and lime but it is not limited thereto, the process according to this present invention being capable of being employed generally for the purpose of reducing the sodium carbonate content of liquors, or solutions, of caustic soda containing sodium carbonate.

The aforesaid double carbonate, after separation of the supernatant liquor; for example, by filtration, can be readily decomposed by means of water and a solution of sodium carbonate be thereby obtained which can be used in the production of caustic soda if so desired.

If it be desired to obtain liquors, or solutions, of caustic soda containing a still less, or practically no, sodium carbonate, most, or all, of the small proportion of sodium carbonate still remaining in the caustic soda liquor, or solution, obtained as hereinbefore described according to this invention, can be removed by causing an oxide, or hydroxide, of strontium, or of barium, to react, in the cold, with the sodium carbonate in the liquor, or solution, it being only necessary to stir the theoretical amount of such an oxide, or hydroxide, with the cold liquor, until the reaction is complete. The carbonate of strontium or barium, can be removed and washed and be reconverted into the corresponding oxide, or hydroxide, by roasting, or in any other suitable way, and this, if desired, can be used again for the treatment of a further batch of liquor, or solution.

The following are examples of how the present invention may be performed, but it is not limited to these examples. The parts are by weight.

*Example 1.*

To 100 parts of liquor, or solution, (which may, for example, be the liquor, or solution, obtained in accordance with my aforesaid application for Letters Patent of even date herewith) containing about 19 per cent of caustic soda and 7 per cent of sodium carbonate; and at a temperature between 20° and 30° centigrade, I add 10 parts of finely divided calcium carbonate, which may, for example, be that obtained according to the first stage of the process of my aforesaid application. If the liquor, or solution, under treatment be one in which there is not present a small quantity of the aforesaid double carbonate, then the mixture is seeded with a small quantity of the said double carbonate. In either case the whole is allowed to stand, stirring at intervals, when sodium carbonate is precipitated with the calcium carbonate as the double carbonate of calcium and sodium. The operation usually takes from about 15 to 20 hours and results in a liquor, or solution, containing from 17.5 to 18.5 per cent of caustic soda and from 2.6 to 3 per cent of sodium carbonate.

*Example 2.*

660 parts of sodium carbonate are dissolved in 2,000 parts of water and the solution is heated to 90° centigrade. The liquor is stirred whilst 300 parts of quicklime are added gradually, the heat of the reaction being sufficient to maintain the temperature. When the reaction has subsided the heating is continued, the mixture being kept boiling for an hour, keeping the volume approximately constant. The product is allowed to cool to between 20° and 30° centigrade and is then seeded with a small quantity of the double carbonate of calcium and sodium. On standing, with occasional stirring, sodium carbonate is precipitated from the liquor, or solution, as the double carbonate of calcium and sodium, until the liquor, or solution, contains approximately from 15.0 to 15.5 per cent of caustic soda and from 2.0 to 2.5 per cent of sodium carbonate. The liquor, or solution, can then be separated from the precipitate by filtration.

If it be desired, after treatment in accordance with either of the preceding examples, to remove still more sodium carbonate by further treatment as hereinbefore mentioned, this can be effected, for instance, as follows:—

The liquor, or solution, of caustic soda containing the small percentage of sodium carbonate is boiled at atmospheric pressure, or under reduced pressure, until the concentration of the caustic soda reaches from 30 to 35 per cent. The solution is then cooled to between 10° and 20° centigrade, when the bulk of the sodium carbonate crystallizes out as the decahydrate $Na_2CO_3 10H_2O$. The solution on filtering from the decahydrate, contains less than one per cent of sodium carbonate.

Or the liquor, or solution, of caustic soda can be stirred for about half an hour, at ordinary temperature, with an amount of strontium oxide, or of barium oxide, equivalent to the sodium carbonate present in the solution. The liquor, or solution, obtained by filtration from the precipitated strontium, or barium carbonate, contains less than 1 per cent of sodium carbonate.

What I claim is:—

1. Reducing the amount of sodium carbonate in a caustic soda solution by treating the said solution with calcium carbonate, thereby forming and precipitating the insoluble double compound of calcium carbonate and sodium carbonate as hereinbefore explained.

2. The separation of sodium carbonate from caustic soda solutions by the addition of an excess of calcium carbonate, thereby forming and precipitating the insoluble calcium-sodium carbonate, and subsequently recovering the sodium carbonate by boiling the said double carbonate in water, substantially as hereinbefore explained.

3. In the manufacture of caustic soda from sodium carbonate by causticizing with lime, carrying out the process by first causticizing in two stages and then effecting the removal of some of the sodium carbonate by means of calcium carbonate, thereby forming the double calcium-sodium carbonate, substantially as hereinbefore explained.

4. In the manufacture of caustic soda from sodium carbonate by causticizing with lime, carrying out the process by first causticizing in two stages and then effecting the removal of some of the sodium carbonate by means of calcium carbonate, thereby forming the double calcium-sodium carbonate, and afterwards further reducing the amount of sodium carbonate.

5. In the manufacture of caustic soda from sodium carbonate by causticizing with lime, carrying out the process by first causticizing in two stages and then effecting the removal of some of the sodium carbonate by means of calcium carbonate, thereby forming the double calcium sodium carbonate, and afterwards further reducing the amount of sodium carbonate by adding a substance which provides a hydroxide of an alkaline-earth metal whose carbonate is less soluble in water than is calcium carbonate.

In testimony whereof I have signed my name to this specification in the presence of two subscribing witnesses.

RICHARD OWEN JONES.

Witnesses:
SIDNEY S. NAPPER,
GILBERT HARDING.